United States Patent

Bobeck

[15] 3,689,901

[45] Sept. 5, 1972

[54] MAGNETIC DOMAIN DETECTOR ARRANGEMENT

[72] Inventor: Andrew Henry Bobeck, Chatham, N.J.

[73] Assignee: Bell Telephone Laboratories Incorporated, Murray Hill, N.J.

[22] Filed: May 6, 1971

[21] Appl. No.: 140,894

[52] U.S. Cl. ....................340/174 TF

[51] Int. Cl. ....................G11c 11/14

[58] Field of Search ....................340/174 TF

[56] References Cited

OTHER PUBLICATIONS

Levi, R. Bubble Splitter, IBM Technical Disclosure Bulletin; Vol. 13, No. 9; Feb. 1971; pp. 27 & 11

*Primary Examiner*—Bernard Konick

*Assistant Examiner*—Gary M. Hoffman

*Attorney*—R. J. Guenther and Kenneth B. Hamlin

[57] ABSTRACT

Single wall domains moved in a slice of a host magnetic material, by changing magnetic pole patterns exhibited by a pattern of magnetic elements in response to a magnetic field reorienting in the plane of the slice, are expanded during propagation at a prescribed point in the pattern due to a localized modification in the pattern there. The expansion of domains relieves constraints on turns in the channel as well as detector design.

12 Claims, 7 Drawing Figures

INVENTOR
A. H. BOBECK
BY Herbert M. Shapiro
ATTORNEY

MAGNETIC DOMAIN DETECTOR ARRANGEMENT

FIELD OF THE INVENTION

This invention relates to data processing arrangements and more particularly to such arrangements in which information is represented as single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving such a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain as is well known.

One propagation arrangement comprises a pattern of electrical conductors each designed to form conductor loops which generate the requisite fields when externally pulsed. The loops are interconnected and pulsed in a three phase manner to produce shift register operation.

An alternative propagation arrangement employs a repetitive pattern of soft magnetic elements adjacent ( slightly spaced from) the surface of a layer in which single wall domains are moved. Alternatively, a pattern of grooves in the surface of the slice may be used. In response to a magnetic field reorienting in the plane of the layer, changing pole patterns are generated in the elements. The elements are arranged to displace domains along a selected path in the layer as the in-plane field reorients. The familiar T-bar (or Y-bar) overlay pattern responds to a rotating in-plane field to so displace domains. Arrangements of this type are called "field access" arrangements.

The field access arrangement permits the realization of very large packing densities. For example, overlay patterns with periods of 0.8 mils are common; but patterns with periods of 0.3 mils have been made, and patterns with periods of 0.1 mils are possible. Certainly, packing densities of from 2 to 10 million bits per square inch are realizable. Unfortunately, the larger the packing density, the smaller the elements of the pattern and the smaller the domains moved thereby. The smaller the domains, the harder it is to detect the domains particularly for domains moved at relatively high speeds. Moreover, turns in channels (or paths) defined by the overlay patterns are typically of a geometry which causes a reduction in the distance between adjacent domains leading to unwanted interactions. Consequently, turns typically exhibit lower operating margins than straight line sections of the channel.

BRIEF DESCRIPTION OF THE INVENTION

The invention is based on the recognition that the larger a domain, the easier it is to detect and that an overlay pattern can be altered to enlarge a domain at a prescribed position during propagation in the field access mode. Accordingly, in one embodiment of this invention a magnetically soft overlay pattern which exhibits changing pole patterns in response to a rotating in-plane field is modified to exhibit a diffuse pole concentration locally along the axis of domain propagation for several successive orientations of the in-plane field during a single cycle of the field. As a result, a domain, displaced by the changing pole pattern, enlarges while it is being moved through the section corresponding to the so-modified pattern. When the portion of the overlay pattern designed for enlarging a domain during propagation is employed for defining a turn in the propagation path, the resulting operating margins at the turn are comparable to those of straight line sections of the path because the turn is negotiated by a domain during a single cycle of the in-plane field in a manner which avoids domain interaction. A detector placed, for example, at the turn responds to relatively large domains to provide improved outputs.

DETAILED DESCRIPTION

Figure 1:
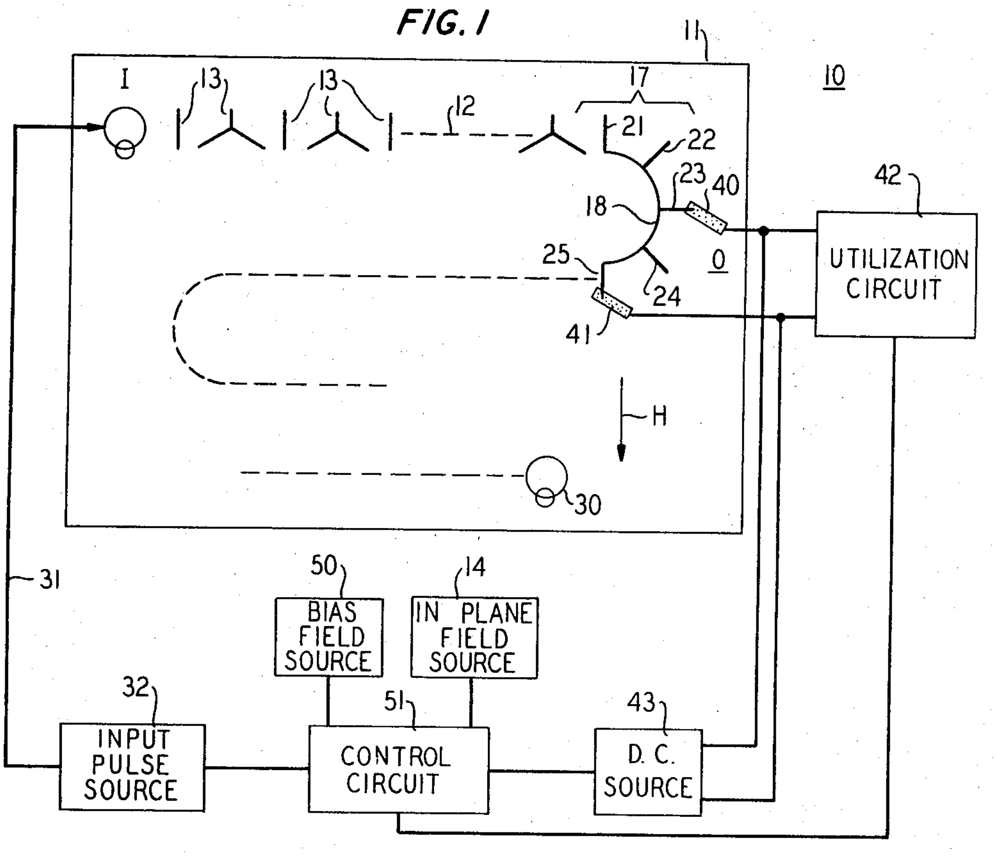
FIG. 1 is a schematic illustration of a field access, domain propagation arrangement in accordance with this invention.

FIG. 1 shows a domain propagation arrangement 10 in accordance with this invention. The arrangement includes a slice of material 11 in which single wall domains can be moved. A representative channel 12 for circulating patterns of single wall domains is defined illustratively by a Y-bar pattern of elements 13.

The pattern is formed of magnetically soft magnetic material which exhibits changing pole patterns in response to a magnetic field rotating clockwise in the plane of slice 11. The in-plane field is provided by a familiar source represented by block 14 in FIG. 1. The pattern may be formed by photolithographic techniques on a glass substrate and abutted with the surface of slice 11. Alternatively, the pattern may be formed directly on slice 11 on a thin spacing layer of, for example, silicon dioxide in order to avoid exchange coupling between the elements and the slice. A typical spacing layer has a thickness of about one-eighth the diameter of a domain in the slice.

The channel can be seen in the figure to form a serpentine path of straight line sections and interconnecting turn sections defined by the overlay geometry. A representative turn is indicated at 17 in FIG. 1. The overlay geometry at the turn comprises a curved element 18 from which a pattern of elements 21 through 25 radiate. The radial elements are illustratively at consecutive 45° orientations with respect to one another.

Figure 2:
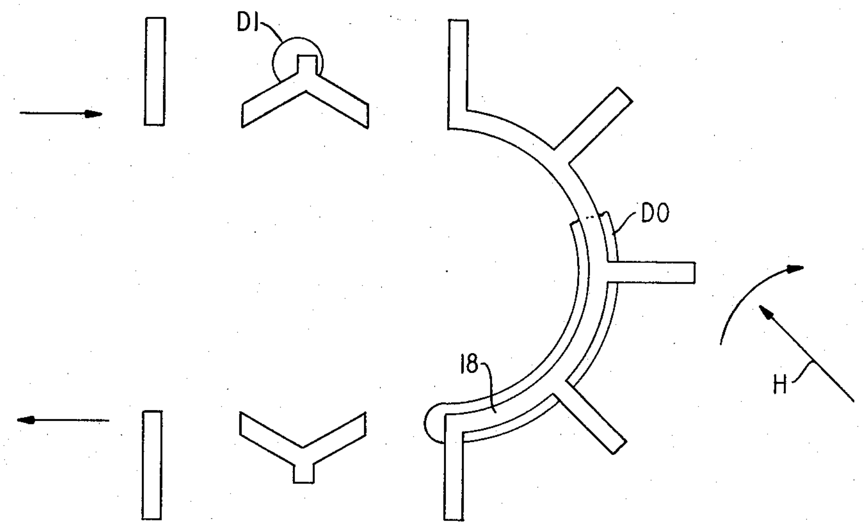
FIGS. 2, 3, 4 and 5 are schematic illustrations of portions of the arrangement of FIG. 1.

As a domain moves from left to right along the top portion of channel 12 as viewed in FIG. 1, it arrives at the bottom of element 21 when the in-plane field is in a downward orientation as indicated by the arrow H in FIG. 1. At this juncture in the propagation operation, magnetic poles which are of a polarity to attract domains accumulate at the bottom of element 21 as viewed. As the in-plane field rotates next through 180°, poles appear in quick succession at the ends of elements 21, 22, 23, 24, and 25 close to element 18, thus forming a diffuse pole for expanding a domain there. By the time the field is directed to the left (slightly upward) as shown in FIG. 2, the domain DO is expanded around the turn and the next following domain D1 (or absent domain) occupies the position in the next subsequent stage as shown in FIG. 2.

Figure 3:
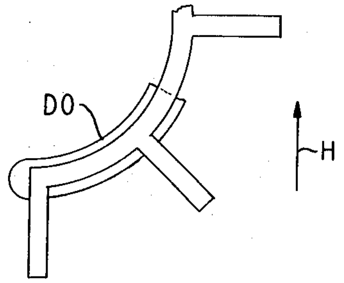

FIG. 3 shows the in-plane field (rotated 180 degrees) now directed upward as indicated by the arrow H. Domain DO, at this juncture has fully negotiated the turn.

Figure 4:
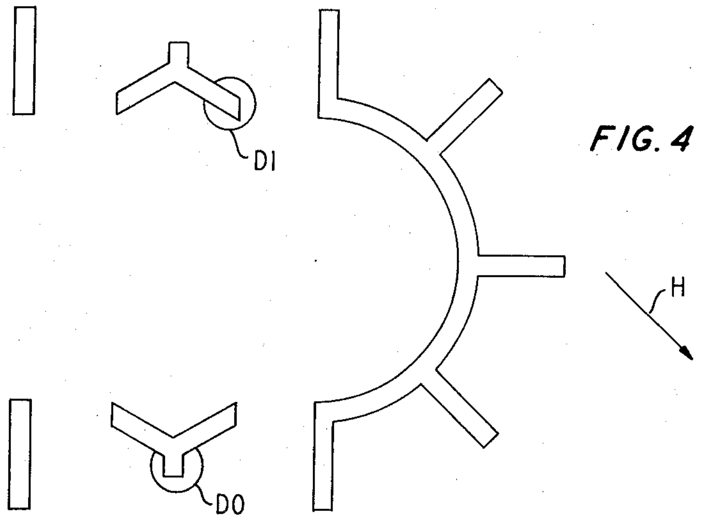

FIG. 4 shows arrow H once again rotated almost into the orientation of the starting point in FIG. 1. At this juncture, domains D0 and D1 move to the positions shown. Domain D1 moves into the turn as the field next rotates to the downward orientation as was the case in connection with FIG. 1.

Figure 5:
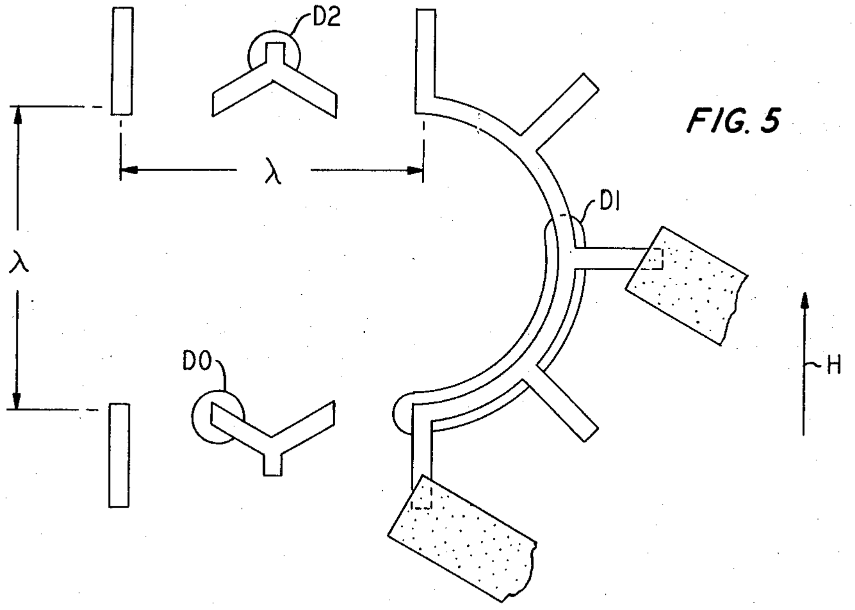

FIG. 5 shows the domain disposition when the field again reorients upward, as indicated by arrow H, in initiating the next cycle of operation. A next subsequent domain D2 advances to the position shown whereas domain D1 occupies the turn as shown.

Domain patterns, moved in the field access mode in channel 12 of FIG. 1, advance from an input position I past an output position O at turn 17 to an annihilator designated 30 in FIG. 1.

A source of domains is provided at I. The source comprises, for example, a magnetically soft disk about the periphery of which a domain moves, following the changing pole patterns induced there, in response to the reorienting in-plane field. The domain divides into two when a conductor, indicated at 31 is pulsed as disclosed in copending patent application Ser. No. 882,137 filed Dec. 4, 1969, for P. I Bonyhard now U.S. Pat. No. 3,611,331. Conductor 31 is connected to a source of input pulses 32 in FIG. 1.

Annihilator 30 similarly comprises a disk of magnetically soft material about the periphery of which a domain also moves in response to the reorienting in-plane field. The domain in this instance is always in a position to coalesce with a domain moving along channel 12 at the position of the annihilator.

A detector is provided at output position O conveniently by forming electrical conductors 40 and 41 illustratively in contact with elements 23 and 25 respectively as shown in FIG. 1. The electrical conductors are connected to a utilization circuit 42. A dc source 43 applies a current (of typically one milliamp) through conductor 40, elements 23, 18, and 25, and conductor 41. The difference in (magneto) resistance of the path exhibited when a domain is present appears as a voltage change between conductors 40 and 41 and is applied to circuit 42. Conductors 40 and 41, of course, could similarly be connected to elements 21 and 25 of FIG. 1.

For domain expanders defined at turns as shown in FIG. 2, no penalty need be incurred as far as area occupied by the modified geometry. As shown, the turn occupies the length of $\pi/2$ stages (or periods $\lambda$) of the Y-bar pattern as is clear from FIG. 5. The turn may occupy a single stage or many stages however.

Figure 6:
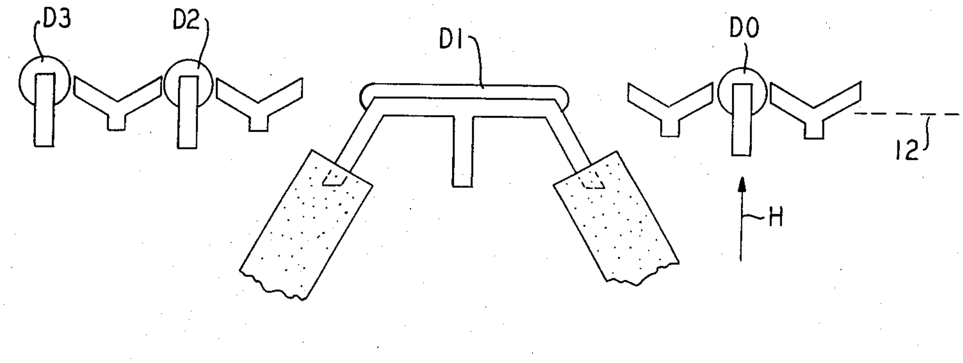
FIGS. 6 and 7 are schematic illustrations of portions of alternative arrangements in accordance with this invention.

FIG. 6, on the other hand, shows an expander occupying a portion of a straight line section of channel 12. A series of domains moving along the channel is represented by domains DO, D1, D2, and D3, domain D1 shown expanded at the expander section. Consecutive domains in a channel are typically separated by a distance equal to three domain diameters ($3d$) to avoid domain interaction. But a domain (D1 of FIG. 6), when expanded, is disproportionately long and may occupy a space greater than three domain diameters. Consequently, the expander stage may have a length of many stages. The ends of the stages in such a case typically are three domain diameters from the adjacent stages as indicated in FIG. 6.

In nonexpander sections of the channel, a domain has a smaller prescribed diameter determined by a bias field in a familiar manner. A source of such a bias field is represented by block 50 of FIG. 1.

Sources 14, 32, 43, and 50, and utilization circuit 42 are connected to a control circuit 51 for synchronization. The various elements may be any such elements capable of operating in accordance with this invention.

Both FIG. 1 and FIG. 6 show a magnetoresistive detector connected to the expander section of the overlay to illustrate alternative positions for such a detector to properly respond to an enlarged domain. When a detector is connected to an expander, the expander includes the common element 18 of FIG. 1 disposed along the axis of domain movement in a propagation channel and the auxiliary elements radiating therefrom disposed to align with the in-plane field for different orientation thereof as already described. But the common element is relatively thin compared with the thickness of the radial and Y-bar elements in order to provide the high resistance necessary for satisfactory performance of the magnetoresistive detector in accordance with well-understood principles.

Figure 7:
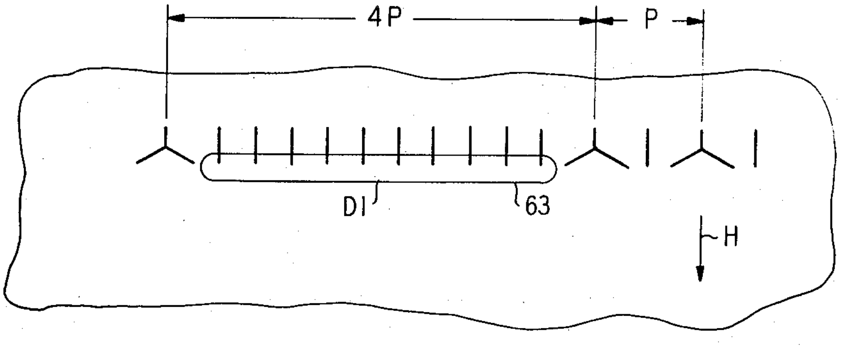

In instances where a magnetoresistive detector is not employed or where a detector is not coupled to an expander, a common element is unnecessary. FIG. 7, for example, shows a portion of a domain propagation channel 61 defined by a Y-bar overlay pattern with an expander section including a number of magnetically soft elements in parallel and oriented vertically with respect to the axis of channel 12 in the absence of a common element. The expander section in FIG. 7 occupies a multistage portion of the propagation channel. Each element of the expander exhibits an attracting pole (not shown) at the bottom thereof as viewed when the in-plane field is directed downward as represented by the arrow H in the figure. Consequently, the domain in the expander (D1 of FIG. 7) occupies the entire (multistage) portion expanding from position 62 to position 63. It is clear then that an expander has additional uses as, for example, adjusting path lengths to allow domains to reach an interaction point simultaneously where space does not otherwise permit the formation of number of paths with like numbers of stages to ensure simultaneous arrival there of domains moving along the paths.

It should be clear also that an expander in accordance with this invention need not include a common element but advantageously employs such an element when utilized in conjunction with a magnetoresistive detector. For magnetoresistive detectors, the common element is relatively thin for peak performance. On the other hand, a common element can be used and its thickness may be equal to the remaining elements of the Y-bar pattern to simplify the process of depositing the pattern. In the last mentioned case, care is taken to ensure that the common element has a geometry which permits a domain to exit from the expander section in a manner consistent with well-understood principles.

An arrangement of the type shown in FIG. 1 is defined in a slice of europium erbium gallium garnet about 4.5 microns thick formed by liquid phase epitaxial deposition techniques on a substrate of gadolinium gallium garnet. Domains in the material are maintained at a nominal diameter of about 4 microns by a bias field of about 90 oersteds. A Y-bar overlay pattern of permalloy having a coercive force of 0.5 oersteds and a thickness of 3,000 A is deposited on a spacing layer of silicon dioxide on the surface of the slice. The pattern has a period of 0.6 mil. The common element 18 of FIG. 1 has a thickness of about 300 A and a radius of 0.3 mil with the common element and the radial elements each having a width of 0.06 mil and spaced minimally 0.06 mil apart at 45° with respect to one another. The radial elements occupy a $\pi/2\ \lambda$ area.

An in-plane field of 20 oersteds rotating at a 100 kHz rate generates a signal of 0.5 millivolts in a magnetoresistive detector disposed as shown in FIG. 1 and connected in a noise cancellation bridge arrangement with like detectors in an arrangement of the type disclosed in copending application Ser. No. 133,206, filed Apr. 12, 1971 for A. H. Bobeck and H. E. D. Scovil. A 1 milliamp current is supplied by source 43 of FIG. 1. The expander enlarges a domain to a length equal to five times its normal diameter thus providing a signal five times that provided by an unexpanded domain in the absence of external amplification.

The permalloy common element may comprise a lamellate structure of 1,500 A permalloy, 200 A chromium, and 1,500 A permalloy, which is operative to define a flux closure path for concentrating available flux for detection and the elements connected to conductors 40 and 41 of FIG. 1 are conveniently arranged at 90° to one another, as shown, to increase the output signal and reduce noise due to the in-plane field respectively.

What has been described is considered only illustrative of the principles of this invention. Therefore, various modifications can be devised by those skilled in the art in accordance with those principles within the spirit and scope of this invention.

What is claimed is:

1. A magnetic arrangement comprising a layer of magnetic material in which single wall domains can be moved, a repetitive pattern of elements operative responsive to a magnetic field reorienting cyclically in the plane of said layer to advance domains one period along a channel defined thereby for each cycle of said field, at least one period of said channel being defined by elements operative first to enlarge and then to contract a domain being advanced thereby along said channel.

2. An arrangement in accordance with claim 1 wherein said first section comprises one stage of said multistage pattern.

3. An arrangement in accordance with claim 1 wherein said first section comprises a plurality of magnetically soft elements disposed to exhibit closely spaced attracting magnetic poles along the axis of domain propagation in said channel in a manner to define an extended diffuse pole there when said in-plane field is aligned with the long dimensions thereof.

4. An arrangement in accordance with claim 1 wherein said first section comprises a plurality of stages of said multistage pattern.

5. An arrangement in accordance with claim 4 wherein said pattern defines a serpentine channel including a turn and said first section of said first geometry includes a magnetically soft curved element for defining said turn.

6. An arrangement in accordance with claim 5 including a plurality of magnetically soft elements radiating outwardly from said curved element and a detector coupled to a pair of said plurality of elements for detecting the presence and absence of domains so expanded there.

7. An arrangement in accordance with claim 5 wherein said first geometry comprises a common magnetically soft element having a first thickness aligned with the axis of domain movement at said turn and includes magnetically soft elements each having a second thickness greater than said first radiating from said common element transverse to said axis.

8. An arrangement in accordance with claim 4 wherein said first geometry comprises a common magnetically soft element aligned with the axis of domain movement in said channel and includes magnetically soft elements radiating from said common element transverse to said axis.

9. An arrangement in accordance with claim 8 wherein said common element has a thickness substantially less than that of said elements radiating therefrom.

10. An arrangement in accordance with claim 1 including means for providing a bias field for maintaining said domains at a prescribed diameter.

11. An arrangement in accordance with claim 10 includes means for providing said reorienting in-plane field.

12. An arrangement comprising a layer of magnetic material in which single wall domains can be moved, a repetitive pattern of magnetically soft elements juxtaposed with a surface of said layer operative responsive to a magnetic field reorienting cyclically in the plane of said layer for moving said domains one period along a channel defined thereby for each cycle of said field from an input through an output position, means for maintaining said domains at a first diameter, said pattern at said output position having a geometry first to enlarge domains to a second diameter larger than said first diameter and thereafter to reduce domains to said first diameter, and means for detecting domains so enlarged at said output position.

* * * * *